United States Patent [19]

Longamore

[11] Patent Number: 4,495,966

[45] Date of Patent: Jan. 29, 1985

[54] SEPARABLE HIGH VACUUM VALVE

[75] Inventor: Robert G. Longamore, Newbury Park, Calif.

[73] Assignee: Electron Beam Corporation, San Diego, Calif.

[21] Appl. No.: 381,646

[22] Filed: May 24, 1982

[51] Int. Cl.[3] ........................ F16L 37/28; F16K 25/00

[52] U.S. Cl. ................................ 137/614.01; 137/572; 137/575; 137/614.18; 251/199; 251/204; 430/296

[58] Field of Search ........... 430/296; 137/614, 614.01, 137/614.18, 614.19, 637.05, 572, 575, 565; 251/212, 149.9, 89.5, 197, 199, 204

[56] References Cited

U.S. PATENT DOCUMENTS

| | | | |
|---|---|---|---|
| 1,002,512 | 12/1913 | Gainer | 137/614 |
| 2,687,903 | 8/1954 | Zeeb | 137/614.01 |
| 3,216,694 | 11/1965 | Perazone | 251/204 |
| 3,321,174 | 5/1967 | Schertler | 251/204 |
| 3,340,176 | 9/1967 | Belluso et al. | 414/217 |
| 3,656,454 | 4/1972 | Schrader | 414/217 |
| 4,052,036 | 10/1977 | Schertler | 251/167 |
| 4,274,454 | 6/1981 | Cook | 137/614 |

*Primary Examiner*—A. Michael Chambers

*Attorney, Agent, or Firm*—Fulwider, Patton, Rieber, Lee & Utecht

[57] ABSTRACT

A valve structure permitting two vacuum chambers (16, 20) to be separted or joined without breaking the vacuum in either. The structure includes first and second valves (10, 12) positioned at openings in the vacuum chambers, a valve housing 30 surrounding the valves and able to be sealed to form a valve lock chamber (32), and a pair of valve actuators (34, 36). Each valve includes a pair of plates movable together to an intermediate position over the opening, and then movable away from each other in response to further actuator movement, to seal one of the plates over the opening. In one disclosed embodiment the plates are moved apart by a pair of parallel pivot links, and in another embodiment a pair of balls is used to effect the required sealing movement.

10 Claims, 7 Drawing Figures

SEPARABLE HIGH VACUUM VALVE

BACKGROUND OF THE INVENTION

This invention relates generally to vacuum equipment, and, more particularly, to valves that are employed to seal vacuum chambers or modules so that they may be separated or reassembled while still under vacuum. There are a number of different valves available for the purpose of sealing a main vacuum chamber while a subsidiary chamber is removed. However, there is no provision to preserve the vacuum in both chambers.

In some applications of vacuum equipment, such as in electron beam lithography, there is frequently a need to be able to separate two vacuum chambers that are coupled together, and later to reassemble them, without breaking the vacuum of either chamber. The present invention satisfies this need.

SUMMARY OF THE INVENTION

The present invention resides in a valve structure that permits the separation or assembly of two vacuum chambers without breaking the vacuum in either chamber. Briefly, and in general terms, the invention includes a first valve permanently attachable to a first of the vacuum chambers and operable to seal an opening in the chamber, and a second valve permanently attachable to the second of the vacuum chambers, and operable to seal an opening in the second chamber. Also included are a valve housing, which is preferably formed integrally with one of the chambers, extending around both of the valves when the chambers are in an assembled condition, means for sealing the valve housing to form a valve lock chamber between the vacuum chambers, actuating means for opening and closing the valves, and means for connecting a vacuum pump to the valve lock chamber.

When the two vacuum chambers are in an assembled condition, with the two valves open, the chambers are connected together through the valve lock chamber. To separate the two chambers, both valves are closed, the valve lock chamber is vented to atmosphere, and the chambers are separated, with vacuum still maintained in each. To reassemble the chambers, they are first coupled together to seal the valve lock chamber, which is then pumped down to close to the same degree of vacuum as the two chambers. Then the two valves are opened to merge the chambers into a single connected space.

Preferably, each of the valves is a linear travel gate valve. In closing the valve, linear movement of its actuating means is used to first move a valve closure transversely across the chamber opening, and then inwardly toward the opening to effect a seal. In opening the valve, linear movement of the actuating means first moves the valve closure outwardly from the chamber opening, and then transversely until the chamber opening is aligned with a corresponding opening in the valve closure.

More specifically, each valve in one presently preferred embodiment of the invention includes a first member movable by the actuating means and forming the valve closure, and a second member disposed in a parallel spaced relationship with respect to the first member, and also movable with the first member by the actuating means. The valve also includes retaining means for holding the first and second members in an operative relationship with respect to the vacuum chamber, and means responsive to movement of the actuating means, for separating the first and second members and urging the first member into sealing contact around the chamber opening. Preferably, the valve also includes resilient means for biasing the first and second members toward each other.

In one preferred embodiment of the invention, the first and second members are flat, parallel plates and the retaining means includes a channel member in which the plates are slidably engaged and a cover to secure the plates in the channel member and adjacent to the vacuum chamber. The means for separating the two plates includes two parallel links pivotally attached to the edges of both plates, such that relative parallel movement of the plates rotates the links and produces a component of motion perpendicular to the plates. The resilient means urges the two plates in opposite directions, parallel with the plates, and therefore urges adjacent faces of the plates into contact when the valve is open.

The actuating means in this embodiment is connected to the second plate. When the plates are being moved from an open position to a closed position, the actuating means first moves both plates together. When the first plate contacts an abutment in the channel member, further movement of the second plate results in rotation of the links and movement of the first plate toward the chamber opening. After the links pass an over-center position, they are urged slightly beyond the over-center position by the resilience of a seal around the opening. The seal pushes on the first plate to urge further rotation of the links. However, the links engage a stop and are prevented from further rotation, leaving the valve effectively locked in its closed position, even when disconnected from the actuating means.

In this embodiment of the invention, two sets of rollers facilitate movement of the second plate. One set engages the cover and permits movement of the second plate across the cover without sliding friction. The other set of rollers is journaled on mounting blocks that extend around or through openings in the first plate. This second set of rollers engages the exterior surface of the vacuum chamber and prevents unnecessary sliding contact between the plate and the resilient seal around the chamber opening. Without the second set of rollers, the seal would be subject to undue wear if the valve were used on top of a vacuum chamber, with the plates resting on the upper chamber wall.

In another preferred embodiment of the invention, the first and second members are also plates, and are also retained by a channel member and a cover. The actuating means includes a bar that extends between the plates. The means for separating the plates and thereby sealing the chamber opening includes a pair of balls captured in a hole through the bar, the centers of the balls being on an axfs substantially perpendicular to the plates. Each plate has a part-spherical indentation to accomodate one of the balls when the valve is in the open position, and the balls are held in the indentations by the resilient means urging the two plates together.

As the actuating means is moved to close the valve, the bar first carries both plates transversely across the chamber opening. During this movement the balls remain in the indentations in the plates. When the first and second plates contact abutment means within the channel member, further movement of the actuator bar results in forcing the balls out of their indentations in the plates, thereby forcing the plates further apart. The second plate is urged against the cover, while the first plate is moved into contact with a resilient seal around the vacuum chamber opening.

When the actuating bar is moved in a reverse direction to open the valve, frictional forces initially prevent any movement of the plates, and the balls are rolled between the plates toward the indentations. The balls are then temporarily captured by the indentations acting as detents, and the plates are oved toward each other by a distance equal to the combined depths of the indentations. Further movement of the actuating bar then carries both plates transversely with respect to the opening.

It will be appreciated from the foregoing that the present invention represents a significant advance in the field of vacuum equipment. In particular, the invention provides a technique for separating and reassembling two vacuum chambers without breaking the vacuum in either. Other aspects and advantages of the invention will become apparent from the following more detailed description, taken in conjunction with the accompanying drawings.

DESCRIPTION OF THE PREFERRED EMBODIMENTS

Figure 1:
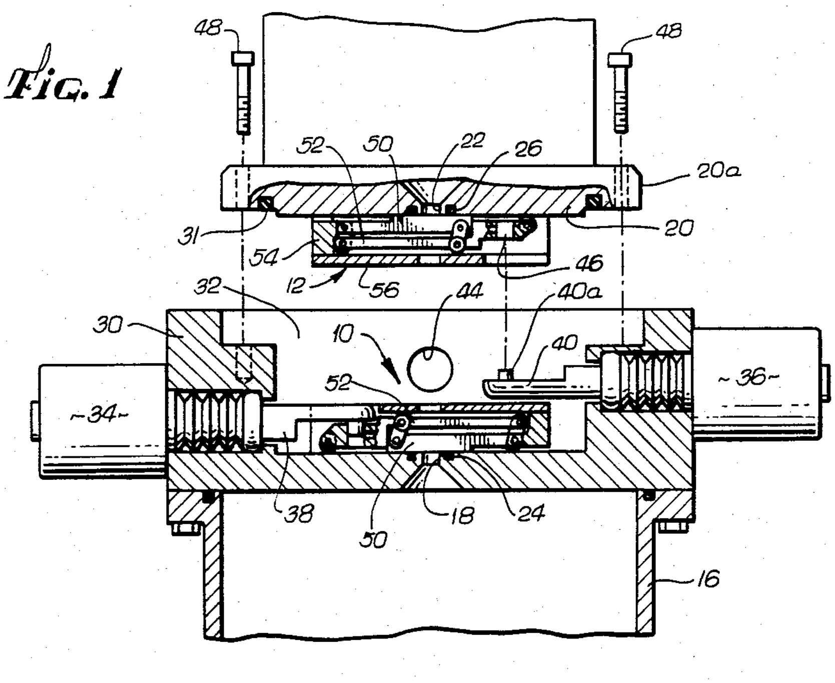
FIG. 1 is an elevational view, partly in section, of a valve structure in accordance with the invention.

As shown in the drawings for purposes of illustration, the present invention is concerned with valves used for sealing a vacuum chamber so that it may be separated from another vacuum chamber. Although various sealing valves have been available in the past, none has permitted separation of two chambers without breaking the vacuum condition of either one.

In accordance with the present invention, each vacuum chamber has an associated valve for sealing an opening into the chamber, and the valves are located in a valve lock chamber that can be sealingly attached to both chambers simultaneously. As shown in more detail in FIG. 1, the apparatus of the invention includes a first valve, indicated generally by reference numeral 10, and a second valve 12. A main vacuum chamber, only a portion of which is shown at 16, has an opening 18, sealable by the first valve 10, and a separable vacuum chamber, a portion of which is shown at 20, has an opening 22, sealable by the second valve 12. The openings 18 and 22 are axially aligned and have associated O-ring seals 24 and 26, respectively, disposed in grooves surrounding the respective openings.

Integral with the main chamber 16 is an upstanding wall 30 that surrounds the valves 10 and 12. When the chambers 16 and 20 are in an assembled condition, the wall 30 is in contact with a portion of the separable chamber 20, and is sealed to the chamber by means of another O-ring seal 31. Together with portions of the chamber walls, the wall 30 encloses a valve lock chamber 32. The valves 10 and 12 have actuators 34 and 36, respectively, which may be any suitable devices, such as solenoids, for providing linear motion. Actuator 34 has an actuator rod 38 that extends through the wall 30, with appropriate sealing, and is coupled to the first valve 10. Similarly, actuator 36 has an actuator rod 40 that extends through the wall 30 and is coupled to the second valve 12.

When the chambers 16 and 20 are assembled together and are both in a vacuum condition, the valves 10 and 12 are usually open. When it is desired to separate the chamber 20 from the main chamber 16, the actuators 34 and 36 are moved inwardly to close both valves 10 and 12, as shown in FIG. 1. Then, the valve lock chamber 32 is vented to atmosphere, through a port 44, and the separable chamber 20 is lifted from the main chamber 16. The valve 12 remains with the separable chamber 20, to maintain the seal on its opening 22, and both actuators 34 and 36, including actuator rod 40, remain with the main chamber 16. A key feature of the invention is the separability of the separable chamber valve 12 from its actuating rod 40. For this reason, actuating rod 40 has an upstanding pin **40*a* that engages in a corresponding hole 46 in the structure of valve 12. On separation, the valve 12 is lifted away from the pin 40*a***.

When it is desired to reassemble the two chambers 16 and 20, the separable chamber 20 is again secured to the wall 30, such as by bolts 48 extending through a flange **20*a* on the separable chamber. The valve lock chamber 32 is then pumped down to practically the same degree of vacuum as the two adjoining vacuum chambers, the valves 10 and 12** are opened, and the chambers are thereby connected together again without breaking the vacuum of either.

Figure 3:
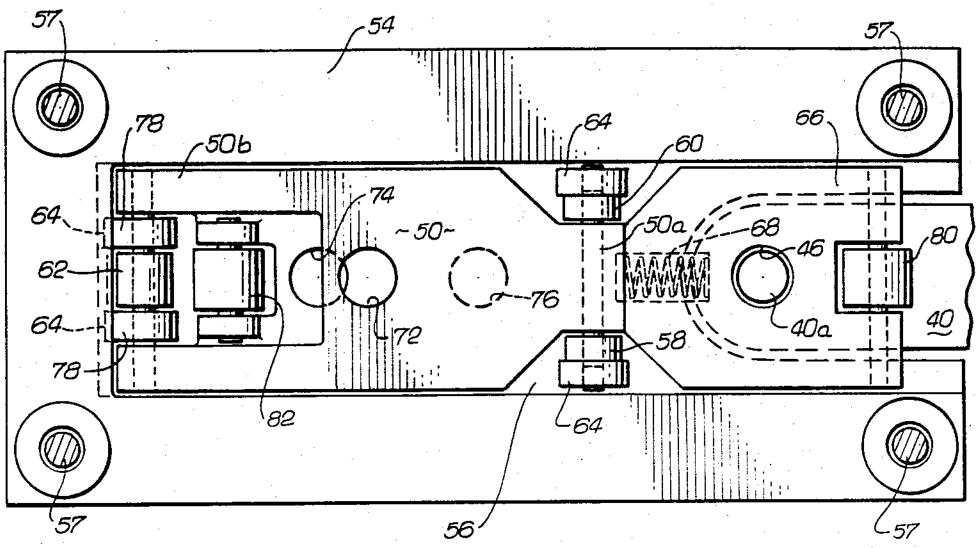
FIG. 3 is a plan view of the valve of FIG. 2, taken substantially along the line 3—3 in FIG. 2, and drawn to a reduced scale.
Figure 2:
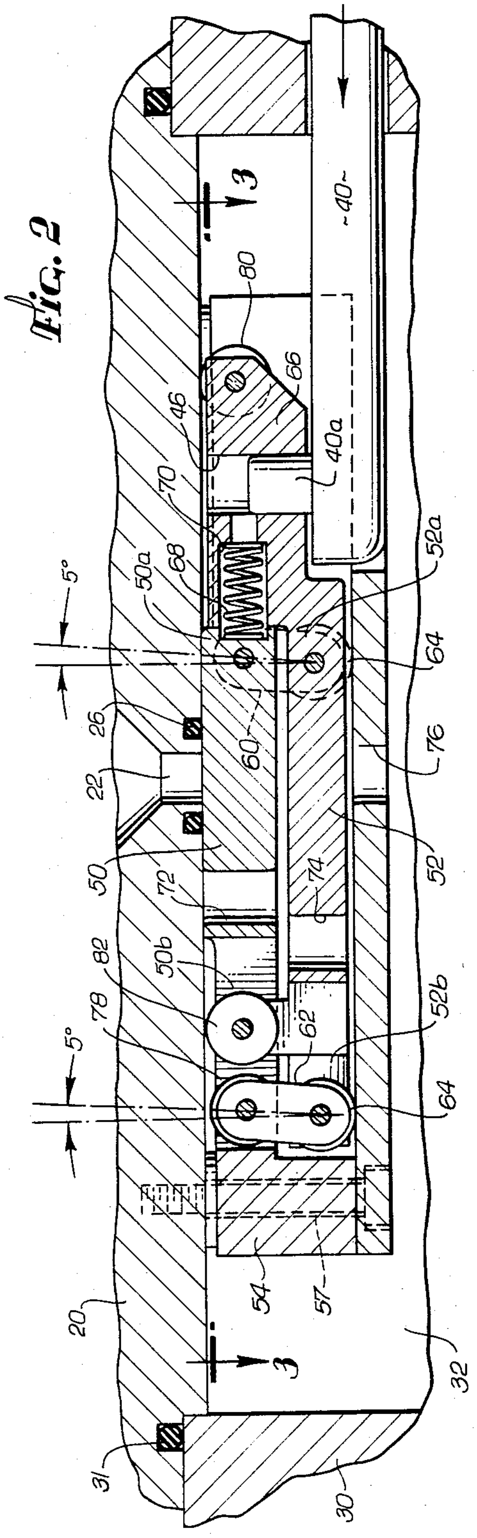
FIG. 2 is a fragmentary enlarged sectional view of one valve used in the structure of FIG. 1, shown in a closed position.

Two embodiments of the valves 10 and 12 are presently contemplated. In the first, shown in FIGS. 2–4, each valve includes first and second flat plates 50 and 52 disposed in parallel relationship with the chamber surface to be sealed, with the first plate being closer to the chamber and forming the valve closure. A U-shaped channel member 54 and a cover 56 together retain and guide the plates 50 and 52, which can then move slidingly with respect to the U-shaped channel member, between the cover and the vacuum chamber. The U-shaped channel member 54 is rigidly secured to the chamber wall, such as by bolts 57 extending through the cover 56 and the channel 54 into the chamber wall.

The plates 50 and 52 are tapered in width at one end, to form narrow end portions **50*a* and 52*a*, respectivley. These end portions are coupled together by a pair of relatively short links 58 and 60, pivtally attached by their ends to the edges of the plates. At their other end of each of the plates 50 and 52 is a forked end portion 50*b* and 52*b*, respectively. At the forked end portions, the plates are coupled together by a third link 62, similar in length to the other two links 58 and 60, and pivotally attached to the edges of the plates within the forked end portions. Rollers 64 are attached to the second plate 52 at the pivot points to which the links 58, 60 and 62 are attached. The rollers 64 bear on the surface of the cover 56 to facilitate sliding movement of the plates 50 and 52**.

Figure 4:
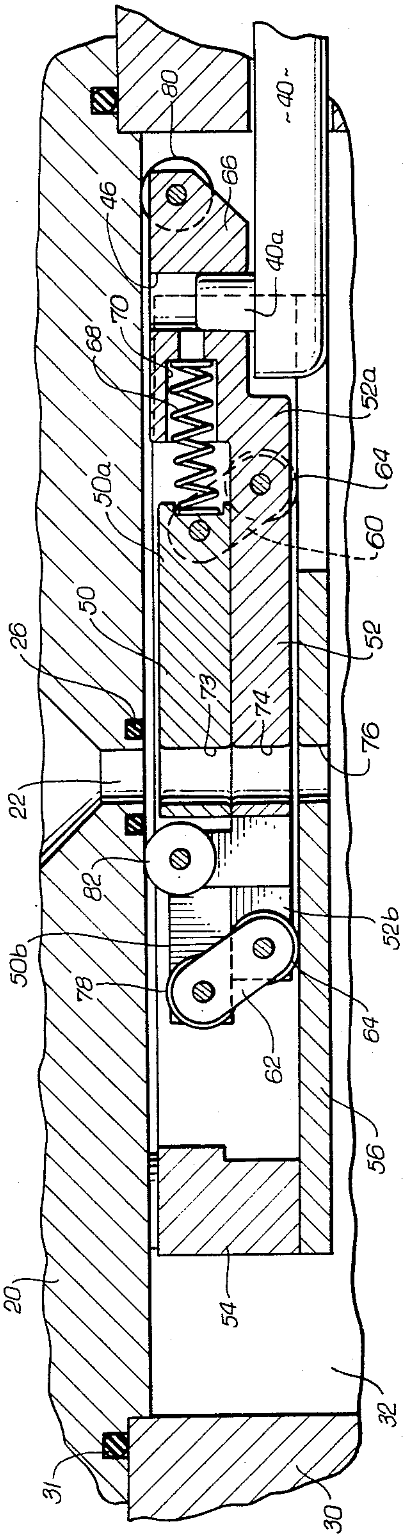
FIG. 4 is a sectional view similar to FIG. 2, but showing the valve in an open position.

At its tapered end portion **52*a* the plate 52 is joined to a block 66** of greater thickness than either plate. The block extends around the end 50*a* of block 50 but is spaced slightly therefrom. A compression spring 68 is disposed with one end in a hole 70 in the block 66, and bears on the end of the first plate 50, thereby urging the two plates 50 and 52 in opposite directions parallel to the plates. The action of the spring 68 also tends to rotate the links 58, 60 and 62, and urges the plates into surface contact when the valve is in an open condition, as shown in FIG. 4. The plates 50 and 52 have holes 72 and 74, respectively, which, in the open position, are aligned with the chamber opening, and with another hole 76 in the cover 56.

To close the valve, the appropriate actuator moves the block 66 in toward the closed end of the U-shaped channel member 54. The block 66 has a hole 46 through it to couple with the actuator. Initially, both plates 50 and 52 are moved with the block 66, toward the closed end of the U-shaped channel 54. The movement continues until the first plate 50 abuts the end of the U-shaped channel 54. Preferably, contact is made through rollers 78 attached to the plate 50 at the pivotal mounting point of the link 62. Further movement of the block 66 and the second plate 52 results in rotation of the links 58, 60 and 62, and separation of the first plate 50 from the second. As the link rotation continues, the first plate 50 makes sealing contact with the O-ring seal 26 around the vacuum chamber opening, and the angular position of the links passes through an over-center position and continues slightly beyond, with the first plate 50 then urging further rotation by action of the resilient seal. Rotation is stopped by abutment between the block 66 and the tapered end portion 50*a* of the first plate 50.

To open the valve, the block 66 and the second plate 52 are moved in the opposite direction. Friction at the point of chamber sealing initially prevents any movement of the first plate 50, and the links 58, 60 and 62 rotate until the plates are again in surface contact and the first plate is clear of the opening. Then, further movement of the second plate 52 also moves the first plate 50, until a fully open position is reached.

Another roller 80 is journalled in the block 66, and yet another roller 82 is mounted on a bracket 84 on the second plate 52. Both rollers 80 and 82 are positioned to engage the chamber wall during opening and closing movements of the valve, thereby preventing unwanted rubbing against the valve seal when the valve is used on top of a chamber, with the weight of the plates tending to produce contact with the seal.

Figure 5:
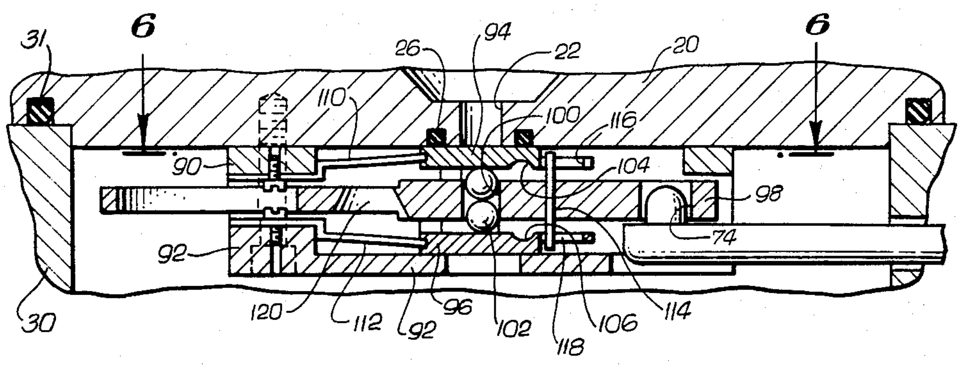
FIG. 5 is a sectional view of a different embodiment of the valve, shown in the closed position.
Figure 6:
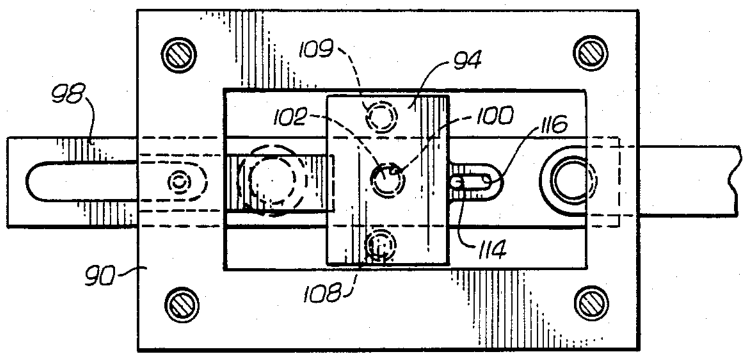
FIG. 6 is a plan view of the valve of FIG. 5, taken substantially along the line 6—6.
Figure 7:
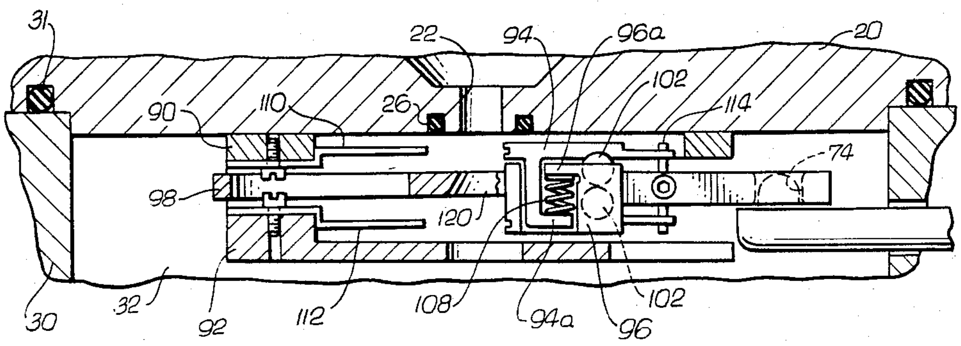
FIG. 7 is a sectional view similar to FIG. 5, but showing the valve in the open position.

The second preferred embodiment of the valve is shown in FIGS. 5-7. This form of the valve includes a retainer block 90 with a channel formed in it, a cover 92, and first and second plates 94 and 96, the first plate being the valve closure element and being positioned next to the vacuum chamber. An actuator bar 98 extends between the plates 94 and 96, and has a hole 100 through it in a direction perpendicular to the plates. Two steel balls 102 are captured in the hole 100, and provide the mechanism for separating the plates when the valve is closed. The first plate 94 has a part-spherical indentation 104 in its surface adjacent to the actuator bar 98, and the second plate 96 similarly has an indentation 106 opposite the first indentation.

The first plate 94 has an integral portion 94*a* that extends first toward the second plate 96 and then parallel with it. Likewise, the second plate 96 has an integral portion 96*a* that extends first toward the first plate and then parallel with it, in such a manner that the two portions 94*a* and 96*a* overlap each other. A compression spring 108 is disposed in the space between the two portions 94*a* and 96*a*, and acts to bias the two plates 94 and 96 toward each other. The plates 94 and 96 have similar portions 94*b* and 96*b* located on the other side of the plate from the portinos 94*a* and 94*b*. A second spring 109 between the parallel sections of portions 94*b* and 96*b* performs the same function as spring 108.

In the open position, the balls 102 engage the respective indentations 104 and 106, and the spring 108 holds the balls in this position. In moving to the closed position shown in FIG. 5, the actuator bar 98 first moves both plates 94 and 96 transversely with respect to the chamber opening. At the end of the channel block 90 are two stop rods 110 and 112, positioned to abut the plates 94 and 96, respectively, when they reach a predetermined position with respect to the chamber opening. Further movement of the actuator bar 98 forces the balls 102 out of the indentations 104 and 106, and therefore forces the plates 94 and 96 further apart. The first plate 94 is in this way moved into sealing contact with the chamber opening, to close the valve. At the same time, a transverse pin 114 through the actuating bar 98 moves along the length of slots 116 and 118 on portions of the plates 94 and 96, respectively. The pin 114 serves to guide and locate the actuator bar 98 with respect to the plates 94 and 96.

To open the valve, the actuator bar 98 is moved in the opposite direction. Frictional forces initially keep the plates 94 and 96 from moving, and the balls 102 are rolled toward the indentations 104 and 106. Once the indentations are reached, the plates 94 and 96 move toward each other under action of the spring 108, and the plates are moved together with the actuating bar 98. A shown in FIG. 7, the plates 94 and 96 in the open position are moved clear of the chamber opening, which is then aligned with a hole 120 through the actuator bar 98.

It will be appreciated from the foregoing that the present invention represents a significant advance in the field of vacuum equipment. In particular, the invention provides a convenient technique for separating and reassembling two vacuum chambers without breaking the vacuum condition of either. It will also be appreciated that, although two specific embodiments of the invention have been described in detail for purposes of illustration, various modifications may be made without departing from the spirit and scope of the invention. Accordingly, the invention is not to be limited except as by the appended claims.

I claim:

1. Apparatus permitting separation or assembly of two vacuum chambers without breaking the vacuum on either chamber, said apparatus comprising:

a first valve permanently attachable to a first vacuum chamber to seal an opening therein;

a second valve permanently attachable to a second vacuum chamber to seal an opening therein;

a valve housing extending around said first and second valves;

means for sealing said valve housing against said vacuum chambers to form a valve lock chamber between said first and second vacuum chambers;

actuating means for opening and closing said first and second valves, said actuating means being operable while said valve lock chamber is attached to said vacuum chambers and while said valve lock chamber is evacuated; and means for connecting a vacuum pump to said valve lock chamber;

whereby the first and second chambers are separable by closing said first and second valves and venting said valve lock chamber to the atmosphere or said first and second vacuum chambers may be assembled by connecting said vacuum chambers to said valve lock chamber, evacuating said valve lock chamber and opening said first and second valves.

2. Apparatus as set forth in claim 1, wherein:

said valve housing remains attached to said first vacuum chamber on separation of said vacuum chambers;

said actuating means is attached to said valve housing; and said actuating means is separable from said second valve in the closed position, to allow separation of said first and second vacuum chambers.

3. Apparatus as set forth in claim 1, wherein each of said first and second valves includes:

a first member movable by said actuating means and forming a valve closure;

a second member disposed in a generally parallel relationship with said first member and movable with it by said actuating means;

retaining means for holding said first and second members in an operative relationship with respect to the first or second vacuum chamber; and means responsive to movement of said actuating means, for separating said first and second members and urging said first member into sealing contact with the vacuum chamber at the chamber opening.

4. Apparatus as set forth in claim 3, wherein each of said first and second valves further includes:

resilient means for biasing said first and second members toward each other.

5. Apparatus as set forth in claim 2, wherein each of said first and second valves includes:

a first member movable by said actuating means and forming a valve closure;

a second member disposed in a generally parallel relationship with said first member and movable with it by said actuating means;

retaining means for holding said first and second members in an operative relationship with respect to the first or second vacuum chamber; and means responsive to movement of said actuating means, for separating said first and second members and urging said first member into sealing contact with the vacuum chamber at the chamber opening.

6. Apparatus as set forth in claim 5, wherein each of said first and second valves further includes:

resilient means for biasing said first and second members toward each other.

7. Apparatus as set forth in claim 1, wherein each of said first and second valves includes:

a first plate forming a valve closure;

a second plate disposed in a parallel, spaced relationship with said first plate, and coupled to said actuating means for movement parallel with said plates;

a valve housing for retaining said plates in an operative relationship with one of the vacuum chambers, said valve housing including a channel for guiding said plates in sliding movement;

at least two parallel links pivotally connecting said plates at their edges;

resilient means urging said first and second plates in opposite directions parallel with said plates, and therefore urging said plates into mutual contact, by operation of said links, when said valve is in an open position; and abutment means located in said channel, to abut said first plate as said plates are moved toward a closed position, and to effect rotation of said links upon further movement of said second plate, whereby said first plate is moved into sealing contact with the vacuum chamber to close said valve.

8. Apparatus as set forth in claim 2, wherein each of said first and second valves includes:

a first plate forming a valve closure;

a second plate disposed in a parallel, spaced relationship with said first plate, and coupled to said actuating means for movement parallel with said plates;

a valve housing for retaining said plates in an operative relationship with one of the vacuum chambers, said valve housing including a channel for guiding said plates in sliding movement;

at least two parallel links pivotally connecting said plates at their edges;

resilient means urging said first and second plates in opposite directions parallel with said plates, and therefore urging said plates into mutual contact, by operation of said links, when said valve is in an open position; and abutment means located in said channel, to abut said first plate as said plates are moved toward a closed position, and to effect rotatfon of said links upon further movement of said second plate, whereby said first plate is moved into sealing contact with the vacuum chamber to close said valve.

9. Apparatus as set forth in claim 1, wherein each of said first and second valves includes:

a first plate forming a valve closure;

a second plate disposed in a parallel, spaced relationship with said first plate;

a valve housing for retaining said first and second plates in an operative relationship with respect to a vacuum chamber;

a bar passing between said first and second plates and coupled to said actuating means to provide axial motion to said bar;

a pair of balls captured between said plates in a hole through said bar;

an indentation in each of said plates to receive one of said balls; and resilient means biasing said plates toward each other;

and wherein said bar is movable between an open position and an intermediate position while said balls are engaged in said indentations, and is further movable to a closed position wherein said balls are moved out of said indentations to force said first and second plates further apart.

10. Apparatus as set forth in claim 2, wherein each of said first and second valves includes:

a first plate forming a valve closure;

a second plate disposed in a parallel, spaced relationship with said first plate;

a valve housing for retaining said first and second plates in an operative relationship with respect to a vacuum chamber;

a bar passing between said first and second plates and coupled to said actuating means to provide axial motion to said bar;

a pair of balls captured between said plates in a hole through said bar;

an indentation in each of said plates to receive one of said balls; and resilient means biasing said plates toward each other; and wherein said bar is movable between an open position and an intermediate position while said balls are engaged in said indentations, and is further movable to a closed position wherein said balls are moved out of said indentations to force said first and second plates further apart.

* * * * *